United States Patent
Capurka et al.

(10) Patent No.: US 6,678,258 B1
(45) Date of Patent: Jan. 13, 2004

(54) METHOD AND APPARATUS FOR PAGING A COMMUNICATION UNIT IN A PACKET DATA COMMUNICATION SYSTEM

(75) Inventors: Tomas Capurka, Palatine, IL (US); Paula Tjandra, Hoffman Estates, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/201,003

(22) Filed: Nov. 30, 1998

(51) Int. Cl.$^7$ ................................................ H04Q 7/00
(52) U.S. Cl. ...................................................... 370/328
(58) Field of Search ............................... 370/328, 329, 370/349, 338, 340, 310, 331, 345; 455/433, 435, 456, 458, 422; 340/825.44, 825.49

(56) References Cited

U.S. PATENT DOCUMENTS

| | | | |
|---|---|---|---|
| 5,710,976 A | | 1/1998 | Hill et al. |
| 5,748,620 A | * | 5/1998 | Capurka ..................... 370/328 |
| 5,901,142 A | * | 5/1999 | Averbuch et al. ........... 370/329 |
| 6,249,681 B1 | * | 6/2001 | Virtanen ..................... 455/466 |

FOREIGN PATENT DOCUMENTS

| | | |
|---|---|---|
| WO | WO9405095 | 3/1994 |
| WO | WO9601030 | 1/1996 |
| WO | WO9744965 | 11/1997 |

\* cited by examiner

*Primary Examiner*—Chi Pham
*Assistant Examiner*—Alexander O. Boakye
(74) *Attorney, Agent, or Firm*—Steven A. May; Jeffrey K. Jacobs

(57) ABSTRACT

A packet data communication system (100) that includes a plurality of communication units and a fixed infrastructure comprising a packet data routing system (101, 103) and a plurality of base sites (111–119), emloys a method and apparatus for paging a communication unit (110). The fixed infrastructure (101, 103, 111–119) transmits a paging message to a communication unit (110) of the plurality of communication units. In response to receiving the paging message, the communication unit (110) transmits an acknowledgment. If the fixed infrastructure (101, 103, 111–119) fails to receive the acknowledgment within a certain waiting period, the fixed infrastructure (101, 103, 111–119) waits at least until the expiration of a backoff period before again transmitting a paging message, wherein the length of time of the backoff period is based on a metric of known system behavioral patterns.

11 Claims, 3 Drawing Sheets

METHOD AND APPARATUS FOR PAGING A COMMUNICATION UNIT IN A PACKET DATA COMMUNICATION SYSTEM

FIELD OF THE INVENTION

This invention relates generally to packet data communication systems, and, in particular, to a method and apparatus for paging a communication unit in a packet data communication system.

BACKGROUND OF THE INVENTION

Packet data communication systems are known in both the land mobile and cellular environments. In the land mobile environment, the packet data system includes a packet router, a central controller, a plurality of base sites, and a plurality of communication units (e.g., mobile radios or portable radios). In a typical land mobile data packet transmission, the packet router provides a data packet from a land user to the central controller, the central controller provides the data packet to the base site serving the communication unit, and the base site transmits the data packet.

Prior to the transmission of the data packet, the communication unit is typically paged by the serving base site. In response to receiving a paging message, the communication unit transmits an acknowledgment and the serving base site, in response to receiving the acknowledgment, transmits the data packet. However, for a variety of reasons, such as the communication unit being active in another service at the time of the page (such as being engaged in an interconnect call), or being out of radio frequency coverage, such as being in a tunnel or deep in a building in a coverage area of the serving base site, or having a dead battery, the communication unit might not respond to the paging message. In the event that the communication unit fails to acknowledge receipt of the paging message, the serving base site typically retransmits the paging message after the expiration of a predetermined time period. The communication system continues to page the communication unit by retransmitting the paging message after each repeated expiration of a constant time interval until either the base site receives an acknowledgment or until a maximum number of retransmissions have occurred. If the communication unit fails to respond after the maximum number of retransmissions, the communication system assumes that efforts to communicate with the communication unit have failed and the data packet is deleted from the system.

The problem with this paging mechanism is that it is inefficient and expensive. Radio frequency communication resources, such as a time slot of a radio frequency carrier, are limited. Each paging message occupies a radio frequency communication resource, and repeated transmittals of paging messages intended for one communication unit blocks alternative uses of the communication resource, such as the paging of other communication units. In turn, system capacity is reduced.

Therefore a need exists for a method and apparatus for paging a communication unit in a packet data communication system that will reduce the number of unsuccessful pages and increase the efficiency of radio frequency communication resource utilization.

DESCRIPTION OF A PREFERRED EMBODIMENT

Figure 1:
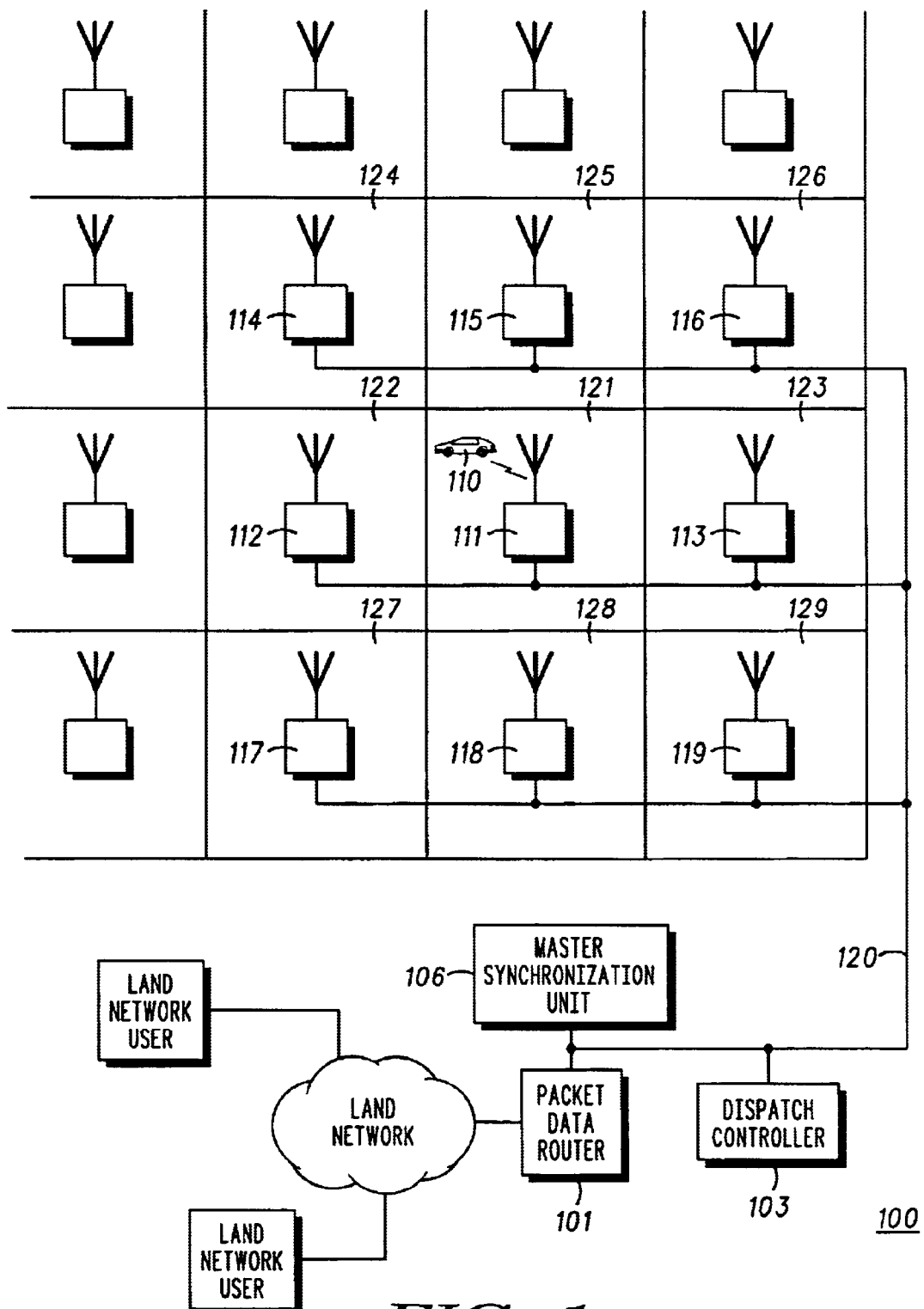
FIG. 1 is a block diagram of a packet data communication system in accordance with a preferred embodiment of the present invention.

To address the need for a method and apparatus for paging a communication unit in a packet data communication system that reduces the number of unsuccessful pages and increases the efficiency of radio frequency communication resource utilization, a packet data communication system that includes multiple communication units and a fixed infrastructure comprising a packet data routing system and a plurality of base sites, employs a method and apparatus for paging a communication unit of the plurality of communication units. The fixed infrastructure transmits a paging message to the communication unit. In response to receiving the paging message, the communication unit transmits an acknowledgment. If the fixed infrastructure fails to receive the acknowledgment within a certain waiting period, the fixed infrastructure waits at least until the expiration of a backoff period before again transmitting a paging message, wherein the length of time of the backoff period is based on a metric of known system behavioral patterns.

Generally, the present invention encompasses a method for paging a communication unit of multiple communication units. The method comprises the steps of transmitting a first paging message, waiting a first time period for an acknowledgment, and when no acknowledgment is received within the first time period, transmitting a second paging message after a second time period has expired, wherein a length of time of the second time period is based on a metric of known system behavioral patterns.

Another embodiment of the present invention encompasses a method for paging a communication unit in a packet data communication system comprising a multiple base sites, a packet data routing system, and multiple communication units. The method comprises the steps of receiving a packet of data intended for a communication unit of the multiple communication units, storing the packet, transmitting a first paging message in response to the receipt of the packet, waiting a waiting period for an acknowledgment, when the acknowledgment is received prior to the expiration of the waiting period then transmitting the packet, when no acknowledgment is received prior to the expiration of the waiting period then backing off from transmitting a second paging message for a length of time at least equal to a backoff period, and wherein a length of time of the backoff period is based on a metric of known system behavioral patterns.

Finally, the present invention encompasses an apparatus for providing a paging message to a communication unit. The apparatus comprises a packet data routing system that receives a packet of data intended for the communication unit, stores the packet of data, distributes the packet of data, determines waiting periods for receipt of acknowledgments and backoff periods between retransmissions of unacknowledged paging messages, and provides a paging message for the communication unit, receives a packet of data intended for the communication unit, stores the packet of data, distributes the packet of data, determines backoff periods between retransmissions of unacknowledged paging messages, wherein the lengths of time of the backoff periods are based on a metric of known system behavioral patterns, and provides a paging message for the communication unit. The apparatus further comprises a plurality of base sites, coupled to the packet data routing system, wherein each base site of the plurality of base site comprises a memory, a processor coupled to the memory, wherein the processor assigns a radio frequency communication resource to the communication unit, a transmitter coupled to the processor, wherein the transmitter transmits the paging message to the communication unit, a receiver coupled to the processor, wherein the receiver receives an acknowledgment transmitted by the communication unit, and a timing reference unit coupled to the processor, wherein the timing reference unit provides a timing reference for the base site and the packet data communication system. The apparatus further comprises a time synchronization unit coupled to each timing reference unit, wherein the time synchronization unit provides a common time base for the communication system.

Turning now to the drawings, wherein like numerals designate like components, FIG. 1 illustrates a packet data communication system in accordance with a preferred embodiment of the present invention. The packet data communication system 100 comprises a packet data routing system, wherein the packet data routing system preferably comprises a packet data router 101 and a dispatch controller 103, multiple base sites 111–119 (nine shown), and multiple communication units 110 (one shown). The packet data router 101, dispatch controller 103, and multiple base sites 111–119 are coupled to each other by a network 120 and together with the network 120 comprise the fixed infrastructure.

Figure 2:
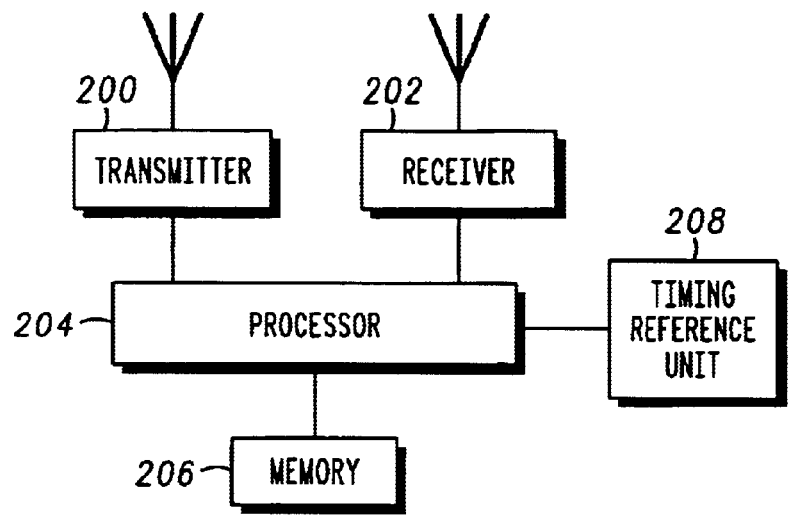
FIG. 2 is a block diagram of a base site that is a part of a packet data communication system in accordance with a preferred embodiment of the present invention.

The packet data router 101 preferably comprises a "MOTOROLA" Mobile Data Gateway (MDG) and routes data packets to the proper base sites based on the packets Internet Protocol (IP) addresses and a pre-established dispatch routing list corresponding to the addresses. The dispatch controller 103 preferably comprises a "MOTOROLA" Dispatch Application Processor (DAP). The communication unit 110 preferably comprises a mobile radio, a portable radio, a radiotelephone, or a wireless data terminal. The base sites 111–119 preferably comprise "iDEN" Enhanced Base Transceiver Sites (EBTS's) that are commercially available from Motorola, Inc. of Schaumburg, Ill. As shown in FIG. 2, each of the base sites 111–119 preferably comprises a processor 204, preferably a microprocessor, coupled to a transmitter 200, a receiver 202, a memory 206, preferably a random access memory (RAM), and a timing reference unit 208. In an alternate embodiment of the present invention, each base site 111–119 further comprises a timing reference unit 208 coupled to the processor 204, wherein each timing reference unit is coupled to a master synchronization unit 106 or to a global positioning system (GPS) receiver, which GPS receiver receives a GPS signal from a GPS satellite and which GPS signal then serves as the common time base. Each base site 111–119 provides communication services to a corresponding service coverage area 121–129.

Operation of the packet data communication system 100 occurs substantially as follows in accordance with the present invention. When the communication unit 110 desires to become active in the communication system 100, the communication unit 110 registers with the dispatch controller 103 via a serving base site (e.g., base site 111) in accordance with known techniques. The dispatch controller 103 updates its routing list to reflect the communication unit's present location.

When a land network user (e.g., a land computer operator or a mobile computer operator connected to the land network) desires to send data to the communication unit 110, the land user sends the data to the communication unit 110 in one or more packets via the land network, the packet data router 101, and the serving base site 111. The packet data router 101 receives a packet of the packet data communication from the land network The packet data router 101 stores the data packet and informs the dispatch controller 103 that the packet data router 101 has a packet for the communication unit 110.

When the communication unit 110 is not in session (i.e., is not receiving data packets from, or transmitting data packets to, the fixed infrastructure), the dispatch controller 103 sends a paging message to multiple base sites (e.g., a group of base sites 111–119). The group of base sites 111–119 are a predetermined group of base sites that include the serving base site 111. In an alternate embodiment of the present invention, the communication unit 110 transmits a message to the dispatch controller 103 via a base site (e.g., the serving base site 111) whenever the communication unit 110 leaves the coverage area 121 of the serving base site 111. In the absence of receiving such a message, the communication system 100 assumes that the communication unit 110 continues to reside in the coverage area 121 of the serving base site 111 and the dispatch controller 103 sends the paging message to the serving base site 111 only.

The base sites 111–119 transmit the paging message on a radio frequency (RF) communication resource allocated for paging messages, to which RF communication resource the communication unit 110 is tuned when the communication unit 110 is not in session. In the preferred embodiment, the packet data communication system comprises a time division multiple access (TDMA) communication system and the RF communication resource accordingly comprises a time slot of a radio frequency carrier. However, in an alternate embodiment of the present invention, the RF communication resource might comprise an RF carrier (e.g., in a frequency division multiple access (FDMA) communication system) or an orthogonal code (e.g., in a code division multiple access (CDMA) communication system). The paging message comprises an identifier, such as an identifying sequence of symbols, that uniquely corresponds to the communication unit 110 intended as the recipient of the message and further comprises information requesting that the communication unit 110 tune to a packet channel.

When the communication unit 110 receives the paging message, the communication unit 110 transmits an acknowledgment of the paging message and a request for assignment of a radio frequency communication resource (i.e., a packet channel) for the transmission of the packet data. At least one of the base sites 111–119 receives the acknowledgment and conveys the acknowledgment to the dispatch controller 103. The dispatch controller 103 conveys the acknowledgment to the packet data router 101 to let the packet data router 101 know that the communication unit 110 received the page. The packet data router 101 then assigns a base site (e.g., base site 111) to serve the communication unit 110. Preferably, the assigned base site 111 assigns a packet channel to the communication unit 110; however, in an alternate embodiment the packet data router 101 might assign the packet channel. The packet data router 101 transmits the data packet to the communication unit via the assigned base site (i.e., base site 111) and the assigned packet channel. In the preferred embodiment, the assignment of a base site by the packet data router 101 is based on a measurement of the carrier-to-interference plus noise ratio (C/I+N) for the signals received by the communication unit 109 from at least one base site 111–119, or alternatively, by at least one base site 111–119 from the communication unit 109, and on whether a base site has an available packet channel.

In the preferred embodiment, after transmitting the paging message, the base sites 111–119 wait a length of time, as determined by reference to the common time base, equal to a first waiting period to receive the acknowledgment from the communication unit 110. If no acknowledgment is received by the base sites 111–119 prior to the expiration of the first waiting period, the packet data router 101 discards the data packet and the communication system 100 enters a backoff mode.

In the backoff mode, the fixed infrastructure does not retransmit a paging message to the communication unit 110 for a length of time, as determined by reference to the common time base, at least equal to a first backoff period. All data packets intended for the communication unit 110 and received by the fixed infrastructure during the first backoff period are discarded, preferably by the packet data router 101. After the expiration of the first backoff period, the fixed infrastructure transmits a second paging message to the communication unit 10 upon receiving a second data packet intended for the communication device 110 from the land network user. If, after transmitting the second paging message, no acknowledgment is received by the base sites 111–119 prior to the expiration of a length of time equal to a second waiting period, then the fixed infrastructure, preferably the packet data router 101, discards the second data packet and does not transmit another paging message to the communication device 110 for a length of time at least equal to a second backoff period. All data packets intended for the communication device 110 and received by the fixed infrastructure during the second backoff period are discarded.

In the preferred embodiment, the repeated transmittals of paging messages followed by a waiting period and a backoff period continue indefinitely, until the communication unit 110 acknowledges a paging message or the communication system 100 is informed of the removal of the communication unit 110 from the communication system 100; however, alternatively, the base site might cease transmitting a paging message after a designated number of transmittals. During each backoff period, all data packets received by the communication system 100 and intended for the communication unit 110 are discarded. After the expiration of each backoff period, the fixed infrastructure transmits a paging message to the communication unit 110 in response to receiving a data packet intended for the communication unit 110 from a land network user. If, after transmitting the paging message, no acknowledgment is received by the base sites 111–119 during a subsequent waiting period, then the fixed infrastructure discards the data packet and does not transmit another paging message to the communication device 110 for a length of time at least equal to the next backoff period.

A counter located in the fixed infrastructure, preferably located in the dispatch controller 103, although alternatively the counter could be located in the packet data router 101, keeps a count of a number of times that a paging message has been sent to the communication unit 110. Alternatively, the counter might keep track of a number of consecutive backoff periods that have expired. When an acknowledgment is received from the communication unit 110, the counter resets to zero. The fixed infrastructure references the counter to determine a waiting period, if the waiting periods are variable in duration, and to determine a backoff period applicable to the transmission of each paging message.

In the preferred embodiment, the lengths of time of the first, second, and subsequent waiting periods are based on the amount of time typically required to transmit a message to a communication unit in the communication system 100, to process the message by a communication unit, and to transmit, by a communication unit, an acknowledgment and a request for assignment of a radio frequency communication resource. The lengths of time of the first, second, and subsequent backoff periods are determined based on a metric, which metric is based on known communication system 100 behavioral patterns. The metric is designed to minimize the number of pages that are transmitted before the communication unit responds to the page while simultaneously paging frequently enough to reach a previously unresponsive pager soon after it becomes available for a page.

In the preferred embodiment, known communication system 100 behavioral patterns constitute statistical distributions relating to the lengths of time that each of the multiple communication units in the communication system 100 are unresponsive to a page (i.e., fail to acknowledge paging messages) when operating in the communication system 100. Preferably, the statistical distributions take into account the various situations when a communication unit is unresponsive (e.g., the communication unit is active in another service, such as an interconnect call, when the paging message is transmitted, or the communication unit is out of RF coverage, such as in the midst of a lengthy tunnel, or the communication unit has a dead battery), the length of time that a communication unit is unresponsive when in each of the various situations, and the data packet rate per communication unit. In the preferred embodiment, after a designated number of unsuccessful attempts to page the communication unit 110, the backoff periods will stop adjusting and remain constant until the communication unit 110 acknowledges a paging message.

For example, suppose that system behavioral patterns indicate that 80% of the time that a communication unit is unresponsive the communication unit is active in an interconnect call, and 20% of the time that the communication unit is unresponsive the communication unit is out of range. Furthermore, suppose that interconnect calls in the communication system 100 typically are three minutes in length and that typically, when a communication unit is out of range, the communication unit remains out of range for one hour. In the above scenario, the first backoff period might be one minute and the second backoff period might be two minutes. These time intervals can be reduced if the system experiences a high data packet rate and these length of these backoff periods might result in a large number of data packets being discarded. In this way, the communication system seeks to capture a first percentage of communication units that statistically become available after a first backoff time of one minute and a second percentage of communication units that become available after a second backoff time of two minutes (for a total backoff time of approximately three minutes). A third, subsequent backoff period might be another two minutes, and backoff periods subsequent to the third backoff period might be significantly longer in time duration due to a change in the primary reason for the unresponsiveness of the communication unit, at first being primarily due to a communication unit being active in an interconnect call, and then, after the expiration of a certain amount of time, being primarily due to the communication unit being out of range.

In an alternate embodiment of the present invention, the communication system 100 monitors the activity of the communication unit, 10 and determines if the communication unit 110 is active in another service (e.g., an interconnect call) at the time that the fixed infrastructure receives a data packet intended for the communication unit, 10. If the communication unit, 10 is active in another service, then the data packet is stored in the packet data router 101 and the transmittal of a paging message is suspended for a first backoff period. After the expiration of the first backoff period, the communication system 100 reconsiders transmitting a paging message to the communication unit 110. If the communication unit 110 is still active in the other service, then the data packet remains stored in the packet data router 101 while the transmittal of a paging message is suspended for a second backoff period. The counter keeps count of the number of suspensions of the transmittal of the paging message. The backoff periods are determined based on communication system 100 behavioral patterns when a communication unit is engaged in the particular type or service. Transmittal reconsiderations and the passage of a backoff period prior to each reconsideration continue until the paging message can be transmitted, at which time the counter is reset to zero.

The present invention, as described above, reduces the number of unsuccessful pages of a communication unit in a packet data communication system and increases the efficiency of radio frequency communication resource utilization by determining the lengths of time of the backoff periods based on a metric, which metric is based on known communication system behavioral patterns. Instead of repeatedly paging a communication unit after waiting a constant interval of time between each page, the present invention utilizes variable intervals of time that have been adapted to the statistical behaviors of communication units in a communication system. The intervals are designed so as to minimize the number of pages that are transmitted before the communication unit responds to the page while simultaneously paging frequently enough to reach a previously unresponsive pager soon after it becomes available for a page. In this way, the present invention seeks to optimize the response rate to the paging messages while minimizing the amount of time that the communication system holds off paging a communication unit that has become available for a page and minimizing the number of data packets that will be discarded. This will afford improved utilization of communication resource, allowing more communication units access to the resource while minimizing the inconvenience, in terms of lost data packets and waiting time, for the communication units.

Figure 3:
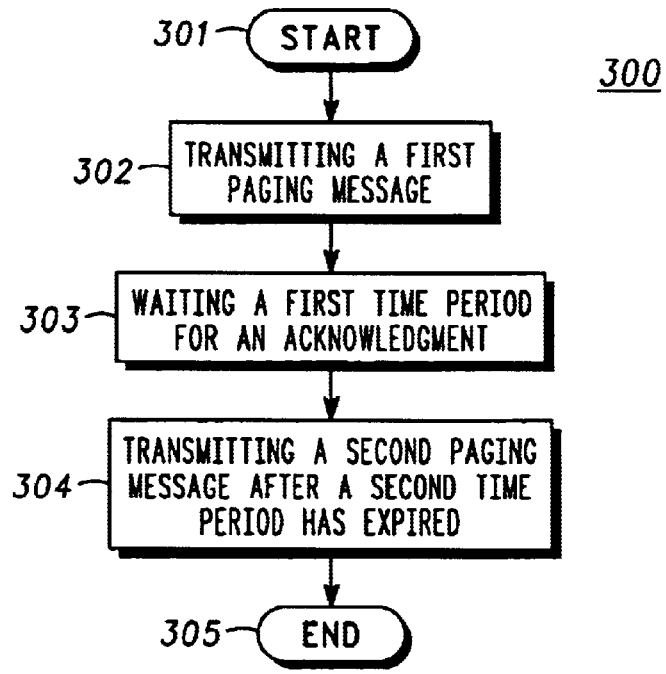
FIG. 3 is a logic flow diagram of the steps executed by a communication system for paging a communication unit in accordance with a preferred embodiment of the present invention.

FIG. 3 illustrates a logic flow diagram 300 of the steps executed by a communication system, wherein the communication system comprises a base site and multiple communication devices, for paging a communication unit of the multiple communication units in accordance with a preferred embodiment of the present invention. The logic flow begins (301) when the communication system, preferably the base site, transmits (302) a first paging message. In the preferred embodiment, the communication unit transmits an acknowledgment in response to receiving the first paging message. However, for a variety of reasons, such as the communication unit being active in another service, such as an interconnect call, or the communication unit being out of RF coverage, such as in the midst of a lengthy tunnel, or the communication unit having a dead battery, the communication unit may not receive the paging message and, as a result, does not send an acknowledgment. The communication system waits (303) a first time period for the acknowledgment. When no acknowledgment is received within the first time period, the communication system, preferably the base site, transmits (304) a second paging message after a second time period has expired, wherein the second time period is based on a metric of known system behavioral patterns, and the logic flow ends (305).

In the preferred embodiment, a length of time of the first time period is based on an amount of time required to transmit a paging message to the communication unit, to process the paging message by the communication unit, and to transmit, by the communication unit, an acknowledgment and a request for assignment of a radio frequency communication resource. The second time period is based a metric of known system behavioral patterns, which metric is designed to minimize the number of pages that are transmitted before the communication unit responds to the page while simultaneously paging frequently enough to reach a previously unresponsive pager soon after it becomes available for a page. In the preferred embodiment of the present invention as described in FIG. 3, known communication system behavioral patterns constitute statistical distributions relating to the lengths of time that each of the multiple communication units in the communication system are unresponsive to a paging message (i.e., fail to acknowledge paging messages) when operating in the communication system. Preferably, as described above, the statistical distributions take into account the various situations when a communication unit is unresponsive (e.g., the communication unit is active in another service, such as an interconnect call, when the paging message is transmitted, or the communication unit is out of RF coverage, such as in the midst of a lengthy tunnel, or the communication unit has a dead battery), the length of time that a communication unit is unresponsive when in each of the various situations, and the data packet rate per communication unit. In the preferred embodiment, after a designated number of unsuccessful attempts to page the communication unit, the time periods will stop adjusting and remain constant until the communication unit acknowledges a paging message or the communication unit is removed from the communication system.

The present invention, as described above, reduces the number of unsuccessful pages of a communication unit and increases the efficiency of radio frequency communication resource utilization by determining the lengths of time of the backoff periods based on a metric, which metric is based on known communication system behavioral patterns. Instead of repeatedly paging a communication unit after waiting a constant interval of time between each page, the present invention utilizes variable intervals of time that have been adapted to the statistical behaviors of communication units in a communication system. This will result in paging attempts tailored to the probabilities that, statistically, a particular number of communication units become available within particular amount of time after a first unsuccessful page, or after a subsequent unsuccessful page.

Figure 4:
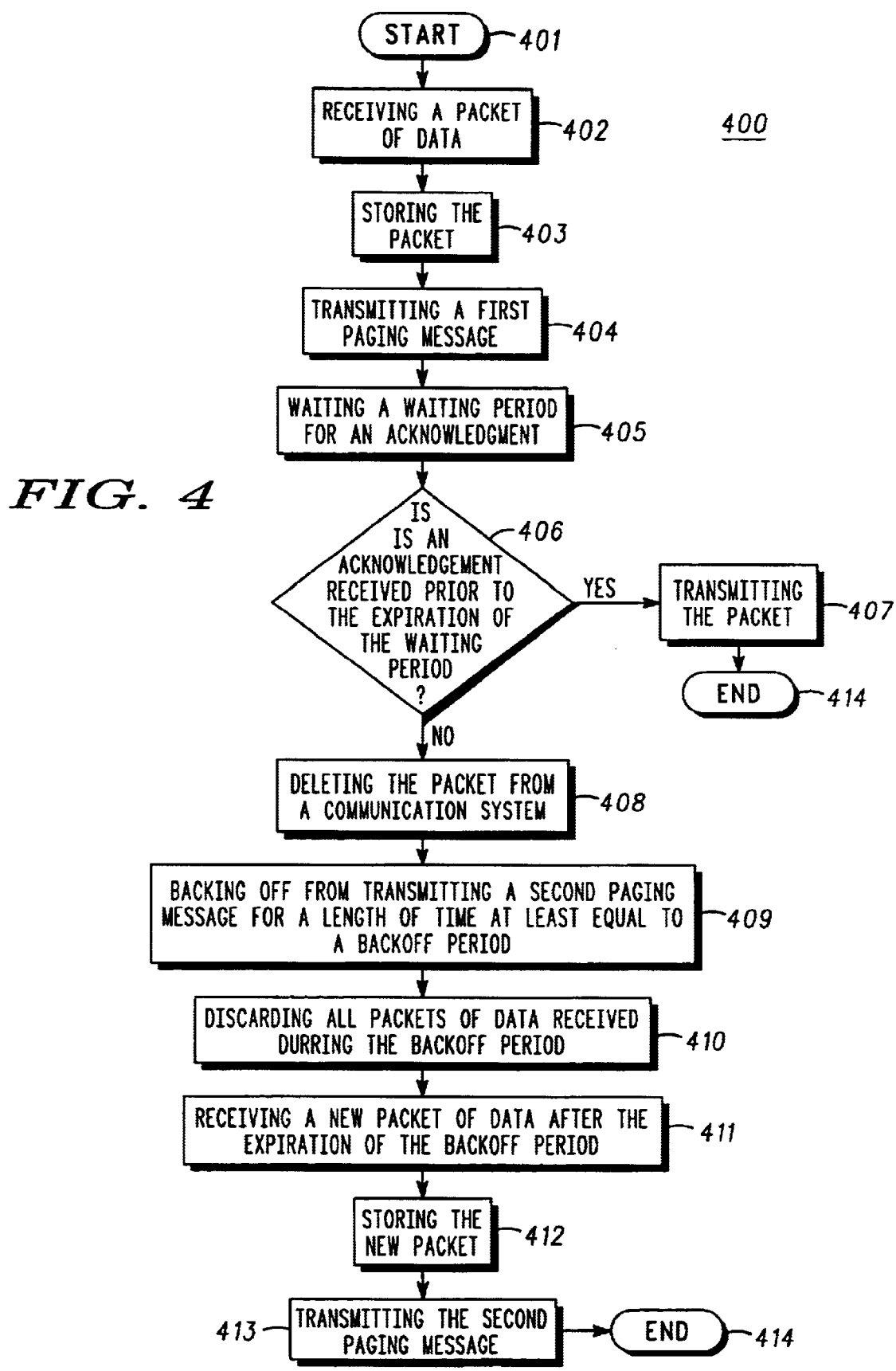
FIG. 4 is a logic flow diagram of the steps executed by a packet data communication system for paging a communication unit in accordance with a preferred embodiment of the present invention.

FIG. 4 illustrates a logic flow diagram 400 of the steps executed by a packet data communication system comprising multiple base sites, a packet data routing system, and multiple communication units, for paging a communication unit of the multiple communication units in accordance with a preferred embodiment of the present invention. The logic flow begins (401) when the communication system receives (402) and stores (403) a packet of data intended for a communication unit of the plurality of communication units. In response to receipt by the communication system of the packet, the communication system, preferably a base site of the plurality of base sites, transmits (404) a first paging message to the communication unit. In the preferred embodiment, the packet data routing system comprises a dispatch controller and a packet data router. The packet data routing system stores the data packet and transmits, via the base site, the first paging message. In the preferred embodiment, when the communication unit receives the first paging message, the communication unit transmits an acknowledgment. The communication system then waits (405) a waiting period for the acknowledgment. When the communication system receives (406) the acknowledgment prior to the expiration of the waiting period, the communication system, preferably the base site, transmits (407) the packet, preferably via the base site, and the logic flow ends (414).

When the communication system fails to receive (406) the acknowledgment prior to the expiration of the waiting period, the packet data routing system deletes (408) the packet from the communication system. Furthermore, when the base site fails to receive the acknowledgment prior to the expiration of the waiting period, the communication system backs off (409) from transmitting a second paging message to the communication unit for a length of time at least equal to a backoff period. In the preferred embodiment, the communication system discards (410) all packets of data received by the communication system during the backoff period. When the communication system receives (411) a new packet of data after the expiration of the backoff period, the communication system stores (412) the new packet, preferably in the packet data routing system, and transmits (413) the second paging message, and the logic flow ends (414).

In the preferred embodiment, the lengths of time of the waiting period is based on the amount of time typically required to transmit a message to a communication unit in the communication system, to process the message by a communication unit, and to transmit, by a communication unit, an acknowledgment and a request for assignment of a radio frequency communication resource. The lengths of time of the backoff period is based on a metric, which metric is based on known communication system behavioral patterns. In the preferred embodiment, known communication system behavioral patterns constitute statistical distributions relating to the lengths of time that each of the multiple communication units in the communication system are unresponsive to a paging message (i.e., fail to acknowledge paging messages) when operating in the communication system. Preferably, as described above, the statistical distributions take into account the various situations when a communication unit is unresponsive (e.g., the communication unit is active in another service, such as an interconnect call, when the paging message is transmitted, or the communication unit is out of RF coverage, such as in the midst of a lengthy tunnel, or the communication unit has a dead battery), the length of time that a communication unit is unreachable when in each of the unresponsive situations, and the data packet rate per communication unit.

In general, the present invention provides a method and an apparatus for paging a communication unit in a packet data communication system that reduces the number of unsuccessful pages and increases the efficiency of radio frequency communication resource utilization by determining the lengths of time of the backoff periods, or non-transmitting time periods after an unsuccessful paging attempt, based on a metric, which metric is based on known communication system behavioral patterns. Instead of repeatedly paging a communication unit after waiting a constant interval of time between each successive unsuccessful page of the communication unit, the present invention utilizes variable intervals of time that have been adapted to the statistical behaviors of communication units in a communication system. By incorporating the statistical behaviors of the communication units in a communication system into the determination of the backoff periods, the present invention seeks to minimize the number of pages that are transmitted before the communication unit responds to the page while simultaneously paging frequently enough to reach a previously unresponsive pager soon after it becomes available for a page. Thus the present invention increases the efficient utilization of a communication resource while minimizing any inconvenience to a user of a communication unit in the communication system.

While the present invention has been particularly shown and described with reference to particular embodiments thereof, it will be understood by those skilled in the art that various changes in form and details may be made therein without departing from the spirit and scope of the present invention.

We claim:

1. A method for paging a communication unit of a plurality of communication units, the method comprising the steps of:

transmitting a first paging message;

waiting a first time period for an acknowledgment; and when no acknowledgment is received within the first time period, transmitting a second paging message after a second time period has expired, wherein a length of time of the second time period is based on a metric of known system behavioral patterns, wherein the metric of known system behavioral patterns is based on statistical distributions relating to the lengths of time that each communication unit of the plurality of communication units in the communication system are unresponsive to a paging message.

2. The method of claim 1, wherein a length of time of the first time period is based on an amount of time required to transmit a paging message to a communication unit of a plurality of communication units, to process the paging message by the communication unit, and to transmit, by the communication unit, an acknowledgment and a request for assignment of a radio frequency communication resource.

3. The method of claim 1, wherein the metric of known system behavioral patterns is based on statistical distributions relating to the lengths of time that each communication unit of the plurality of communication units in the communication system are unresponsive to a paging message when active in a particular service.

4. In a packet data communication system comprising a plurality of base sites, a packet data routing system, and a plurality of communication units, a method for paging a communication unit of the plurality of communication units, the method comprising the steps of:

receiving a packet of data intended for a communication unit of the plurality of communication units;

storing the packet;

transmitting a first paging message in response to the receipt of the packet;

waiting a waiting period for an acknowledgment;

when the acknowledgment is received prior to the expiration of the waiting period, transmitting the packet;

when no acknowledgment is received prior to the expiration of the waiting period, backing off from transmitting a second paging message for a length of time at least equal to a backoff period; and wherein a length of time of the backoff period is based on a metric of known system behavioral patterns, wherein the metric of known system behavioral patterns is based on statistical distributions relating to the lengths of time that each communication unit of the plurality of communication units in the communication system are unresponsive to a paging message.

5. The method of claim 4, wherein the length of time of the waiting period is based on an amount of time required to transmit a paging message to a communication unit of a plurality of communication units, to process the paging message by the communication unit, and to transmit, by the communication unit, an acknowledgment and a request for assignment of a radio frequency communication resource.

6. The method of claim 4, further comprising the step of:

when no acknowledgment is received prior to the expiration of the waiting period, deleting the packet from the communication system.

7. The method of claim 4, further comprising the step of:

when no acknowledgment is received prior to the expiration of the waiting period, deleting all packets received during the backoff period.

8. The method of claim further comprising the step of:

when no acknowledgment is received prior to the expiration of the waiting period, backing off from transmitting the second paging message until a new packet of data intended for the communication unit is received after the expiration of the backoff period;

storing the new packet of data; and transmitting the second paging message.

9. In a packet data communication system, an apparatus for providing a paging message to a communication unit, the apparatus comprising:

a packet data routing system that receives a packet of data intended for the communication unit, stores the packet of data, distributes the packet of data, determines waiting periods and backoff periods between retransmissions of unacknowledged paging messages, and provides a paging message for the communication unit;

a plurality of base sites, coupled to the packet data routing system, wherein each base site of the plurality of base site comprises:

a memory;

a processor coupled to the memory, wherein the processor assigns a radio frequency communication resource to the communication unit;

a transmitter coupled to the processor, wherein the transmitter transmits the paging message to the communication unit;

a receiver coupled to the processor, wherein the receiver receives an acknowledgment transmitted by the communication unit; and wherein the lengths of time of the backoff periods are based on a metric of known system behavioral patterns, wherein the metric of known system behavioral patterns is based on statistical distributions relating to the lengths of time that each communication unit of a plurality of communication units in the communication system are unresponsive to a paging message.

10. The apparatus of claim 9, wherein each base site of the plurality of base sites further comprises a timing reference unit coupled to the processor, wherein each timing reference unit is coupled to a master synchronization unit.

11. The apparatus of claim 9, wherein each base site of the plurality of base sites further comprises a timing reference unit coupled to the processor and a global positioning satellite receiver coupled to the timing reference unit.

* * * * *

UNITED STATES PATENT AND TRADEMARK OFFICE
CERTIFICATE OF CORRECTION

PATENT NO. : 6,678,258 B1
DATED : January 13, 2004
INVENTOR(S) : Capurka et al.

It is certified that error appears in the above-identified patent and that said Letters Patent is hereby corrected as shown below:

Column 11,
Line 25, reads "claim further", should be -- claim 4 further --.

Signed and Sealed this

Sixteenth Day of March, 2004

JON W. DUDAS
*Acting Director of the United States Patent and Trademark Office*